United States Patent [19]

Yamazaki et al.

[11] 4,293,185
[45] Oct. 6, 1981

[54] OPTICAL CONVERSION ASSEMBLY FOR OBJECTIVE CAMERA LENSES

[75] Inventors: Yasuo Yamazaki, Kawachinagano; Takeshi Egawa, Sennan, both of Japan

[73] Assignee: Minolta Camera Kabushiki Kaisha, Osaka, Japan

[21] Appl. No.: 106,444

[22] Filed: Dec. 26, 1979

[30] Foreign Application Priority Data

Jan. 12, 1979 [JP] Japan .................................. 54-3276[U]

[51] Int. Cl.³ ............................................ G02B 21/00
[52] U.S. Cl. ......................................... 350/18; 350/53
[58] Field of Search ............................ 350/18, 53, 410

[56] References Cited

U.S. PATENT DOCUMENTS

| 3,112,570 | 12/1963 | De Vasconcellos | 350/18 X |
| 3,535,015 | 10/1970 | Yevick et al. | 350/18 |
| 3,574,954 | 4/1971 | Schone et al. | 350/18 X |

Primary Examiner—John K. Corbin
Assistant Examiner—Matthew W. Koren
Attorney, Agent, or Firm—Jackson, Jones & Price

[57] ABSTRACT

An optical conversion attachment assembly for objective camera lenses is provided to convert a lens into a monocular optical device. A camera exchangeable lens can be detachably mounted on the barrel of an optical attachment having an erecting prism and an ocular system to vary the diopter power. The optical attachment further provides a device for automatically contacting and holding the diaphragm of the camera exchange lens at a maximum aperture opening.

8 Claims, 2 Drawing Figures

OPTICAL CONVERSION ASSEMBLY FOR OBJECTIVE CAMERA LENSES

BACKGROUND OF THE INVENTION

1. Field of the Invention

The present invention relates to an optical conversion assembly to convert exchangeable objective lenses of a camera into a monocular optical device such as a telescope, a microscope or a viewer.

2. Description of the Prior Art

The interchangeable lenses that are utilized on high quality still cameras such as 35 mm cameras and movie cameras have developed to a state wherein they have excellent resolving powers from the vicinity of the optical axis of the field of view to the outer circumference. These lenses are frequently coated to prevent reflection losses across a broad wavelength spectrum. The lenses provide highly accurate color reproduction with a minimum of reflection between the lens surfaces and minimum internal reflection in the lens barrel to eliminate any optical flare and ghost images. In many cases, the commercial cost of these wide angle, telephoto, and zoom lenses far exceeds the cost of the camera bodies.

Frequently, both amateur and professional photographers carry a number of exchangeable lenses with their camera to be prepared for various types of shots requiring the different lenses. These lenses can represent a substantial investment and to date have generally found no other substantial application other than being mounted on the camera. There is thus a need in the prior art to permit alternative utilization of these interchangeable lenses outside of the camera photography field.

Cited of general interest for its disclosure of a prism system in a telescope in U.S. Pat. No. 4,030,808.

SUMMARY OF THE INVENTION

A primary object of the present invention is to provide an optical attachment which is capable of converting exchangeable objective lenses of cameras into a useful monocular optical device, such as a telescope, a microscope or a viewer.

The optical attachment of the present invention includes a barrel housing having at one end a lens mounting means capable of interfacing with appropriate mounting means on a camera exchangeable lens such as a bayonet mounting arrangement. Means are provided on the optical attachment for automatically contacting and holding the diaphragm of the camera exchangeable lens in a maximum aperture opening. An ocular system is provided including movable lens to permit diopter power adjustment. Mounted within the barrel housing is a prism erecting system for rotating the transmitted image both about a vertical and horizontal axis to provide an erect viewing image.

The foregoing and other objects, features and advantages of the present invention will become more readily apparent from the following description of illustrated embodiments thereof taken in reference with respect to the accompanying drawings.

DESCRIPTION OF THE PREFERRED EMBODIMENTS

Figure 1:
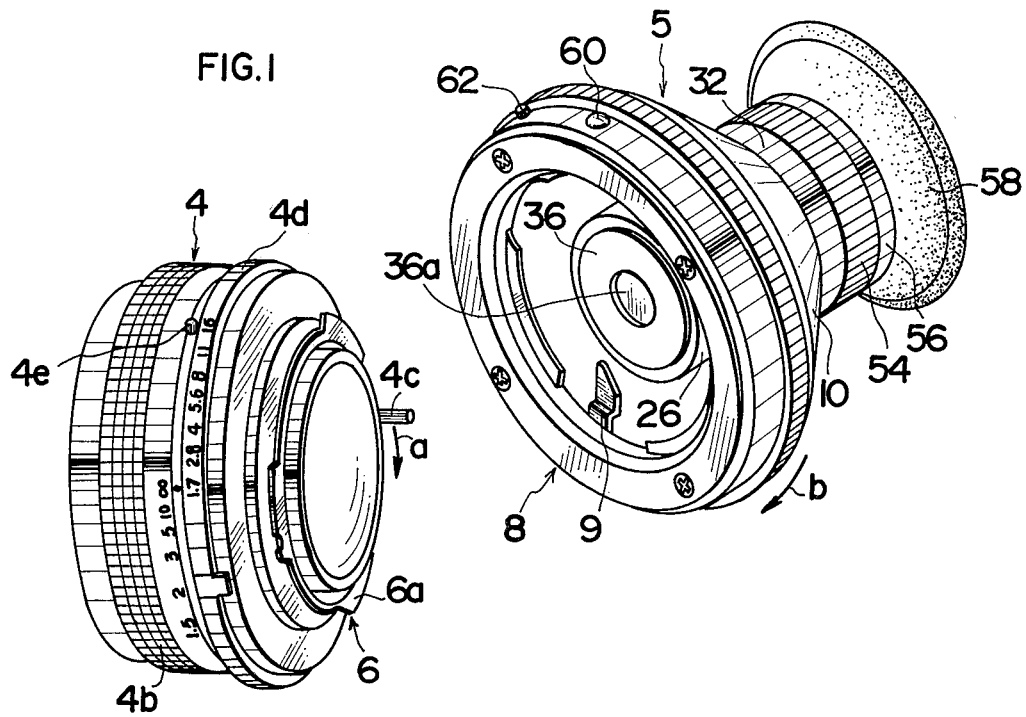
FIG. 1 discloses an exploded perspective view of the combination of a camera objective lens and the optical conversation assembly of the present invention, and FIG. 2 discloses a partially schematic cross-sectional view of the present invention.

The following description is provided to enable any person skilled in the optical art to make and use the invention and sets forth the best mode contemplated by the inventors of carrying out their invention. Various modifications, however, will remain readily apparent to those skilled in the art, since the generic principles of the present invention have been defined herein specifically to provide an optical conversion assembly capable of being removably mounted on various camera objective lenses to permit their secondary use as a monocular optical device in a relatively economical manner.

The description will now be given of the preferred embodiment of the present invention according to the drawing.

Referring to FIG. 1, an objective camera exchangeable lens 4 has a camera mounting means 6 which is well known per se, such as a known bayonet flange 6a used by the Minolta Camera Co. The exchangeable lens 4 is capable of being mounted on a camera body (not shown) by means of the camera mounting means 6. Exchangeable lens 4 carries a diaphragm interlocking pin 4c which is biased in the direction of arrow (a) so as to stop down an internal diaphragm mechanism to a predetermined aperture size which can be preset by an external diaphragm setting ring member 4d. Diaphragm interlocking pin 4c, when forcibly moved in a direction opposite to that of arrow (a), increases the aperture size of the diaphragm mechanism, irrespective of the set position of diaphragm setting member 4d. Therefore, the diaphragm mechanism is maintained in its fully opened condition as long as diaphragm interlocking pin 4c is maintained at an extreme position in the direction opposite to that of arrow (a).

Provided at the front end of an optical conversion attachment assembly 5 is lens mounting means 8, which is capable of direct coupling to the camera mounting means 6 of exchangeable lens 4. The lens mounting means 8 firmly secures exchangeable lens 4 to optical assembly 5 to form a monocular optical device, such as a telescope or a microscope. The construction of lens mounting means 8 is identical to the known lens mounting means provided on a camera body for securing an exchangeable lens and includes spaced flange retainer members of a complementary shape and configuration.

When lens mounting means 8 of optical attachment 5 is coupled to camera mounting means 6 of exchangeable lens 4, the optical attachment 5 is rotated in the direction of arrow (b), the exchangeable lens 4 and optical attachment 5 are firmly connected in place and can then be locked by a locking means (not shown) so that both may not be disconnected from each other. Provided in the vicinity of lens mounting means 8 of optical attachment 5 is a tongue member 9, which automatically engages diaphragm interlocking pin 4c of exchangeable lens 4 when optical attachment 5 and exchangeable lens 4 are coupled to each other in the abovementioned manner so as to move diaphragm interlocking pin 4c in the direction opposite to that of arrow (a) and hold the aperture opening to a maximum nonadjustable position.

Figure 2:
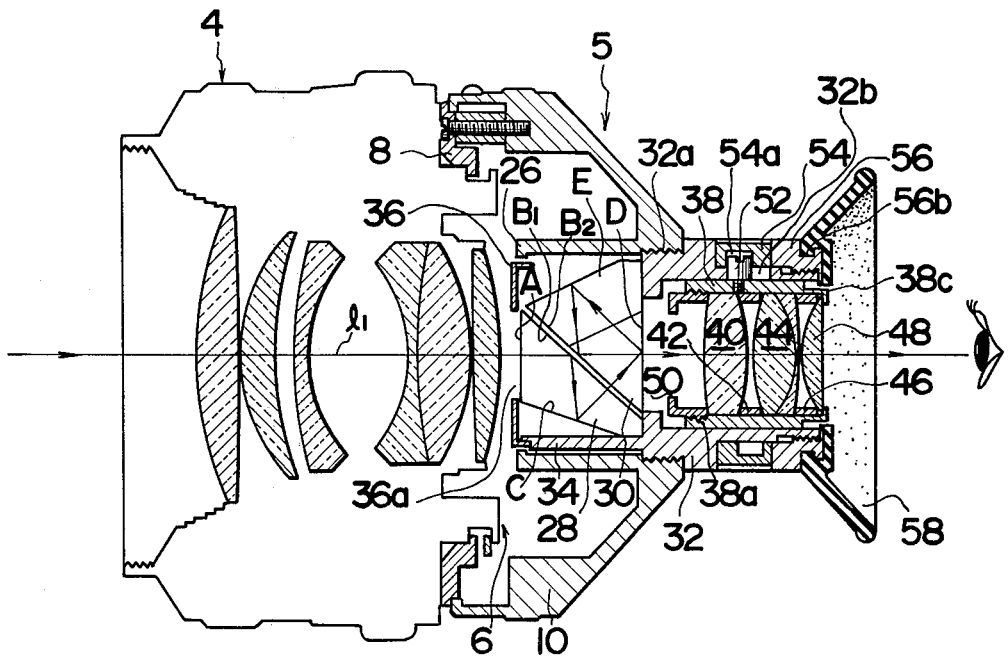

Referring now to FIG. 2, internal cylinder 26 is formed integrally with external cylinder 10 and includes two prisms 28 and 30 that comprise a prism erecting system. These prisms are mounted with a slight gap between their opposing surfaces, B1 and B2. The prisms 28 and 30 can be Schmidt or Pechan prisms having a light incident surface A and a light exiting surface D, both of which cross the optical axis $l_1$ at a substantially right angle (90°). Light incident on prism 28 from light incident surface A is reflected onto opposing surface $B_1$, then reflected on side surface C and transmitted through opposing surface $B_1$. The light is then incident upon surface $B_2$ of prism 30. After being reflected on light exiting surface D and reflected on roof surface E, the light is reflected on opposing surface $B_2$ and is transmitted rearward through the light exiting surface D as a result of this prism system. The top and bottom of an image are inverted through these five reflections of light and the left and right of the image is also inverted by roof surface E of prism 30. That is to say, the image passing through prisms 28 and 30 is inverted vertically and horizontally.

Semicircular cylindrical prism support member 34 is formed integrally with an ocular cylinder 32 which is located inside internal cylinder 26 of external cylinder 10 to support prisms 28 and 30. In more detail, prisms 28 and 30 are fixed by a leaf spring (not shown) inside the prism support member 34 and they are further pressed against the front end of ocular cylinder 32 by holder 36 which is fixed on the tip of prism support member 34 so that they may not move along the optical axis, l. Holder 36 has a circular opening 36a, which is adjacent the rear surface of a lens system of exchangeable lens 4. Ocular cylinder 32 is screw fastened through threads 32a at its front end to external cylinder 10. Provided inside ocular cylinder 32 is a sliding internal cylinder 38, which is slidable along the optical axis. Mounted inside sliding internal cylinder 38 are a lens 40, cemented doublet 44 and lens 48 which are arranged in that order from the front at predetermined intervals set by spacers 42 and 46 to comprise the ocular system. Furthermore, ocular holding ring 50 is screwed through thread 38a to the front end of sliding internal cylinder 38. Lens 40, cemented doublet 44 and lens 48 making up the ocular system are fixed by ocular holding ring 50 as it presses against flange 38c formed at the other opening end of sliding internal cylinder 38. Pin 52, carried by sliding internal cylinder 38, is fitted into cam groove 54a formed on the internal surface of diopter adjusting ring 54. Pin 52 further extends through groove 32b formed on ocular cylinder 32 and extending elongated along the optical axis.

Diopter adjusting ring 54 is rotatably engaged with the circumference of ocular cylinder 32 and is restricted in axial movement by fixed ring 56 screwed to the rear end of ocular cylinder 32. When diopter adjusting ring 54 is rotated, pin 52, carried by sliding internal cylinder 38, is forced by cam groove 54a and guided by groove 32b to shift along the optical axis. As a result, the sliding internal cylinder 38 and the ocular system consisting of lens 40, cemented doublet 44 and lens 48 are moved, as a whole, along the optical axis for dioptric adjustment. Formed circumferentially on fixed ring 56 is an annular groove 56b which is fitted with a rubber ocular hood 58.

Provided on the circumference of external cylinder 10 is an index 60 for use in mounting an exchangeable lens and a lock release button 62 for removing the exchangeable lens.

With the above construction, optical attachment 5 and exchangeable lens 4 can be matched so that the indices 60 and 4e may coincide with each other, and optical attachment 5 is rotated in the direction of arrow b to be firmly coupled with an exchangeable lens 4. During this connection, the diaphragm interlocking pin 4c of exchangeable lens 4 is moved by tongue member 9 in the direction opposite to that of arrow (a), whereby the diaphragm mechanism of exchangeable lens 4 is maintained in its fully opened condition. Then, diopter adjustment is performed by rotating diopter adjusting ring 54. While observing through the ocular section at the rear, distance setting ring 4b of exchangeable lens 4 is rotated, whereby the real image of an object erected vertically and horizontally appears at the rear of light projecting surface D of prism 30. Looking at an object through the ocular, an enlarged image erected vertically and horizontally appears.

For example, when mounting an exchangeable lens of focal length 50 mm for use as a standard lens for 35 mm single lens reflex cameras, it is possible to provide an ocular system such as a telescope with 5X to 10X magnification. Furthermore, by mounting zoom lenses of focal length 100 mm to 200 mm on the optical attachment it is possible to provide telescopes with a higher magnification. Thus, even when different exchangeable lenses are used, the distance is constant from the mounting surface to the focal plane of various types of exchangeable lenses capable of mounting on a single type of camera. Real images transmitted through the exchangeable lenses are always in focus at the same position and can be observed by the same ocular. Therefore, the optical attachment can be used for a variety of exchangeable lenses and produces sharp images at all times with any type of exchangeable lenses.

Furthermore, when an intermediate ring or bellows is provided between an exchangeable lens and the optical attachment for closeups, the optical attachment can be used as a microscope of 20X to 100X magnification. Such a microscope, contrary to conventional ones, has a wide field of view and is capable of producing an erect image.

The use of the above described optical attachment makes it possible to observe the magnification and image formation of exchangeable lenses without using a camera. In this case, images are visible without being affected by a focal plane or the like of a camera, making it possible to easily see the difference of angle of views of exchangeable lenses and also to use the optical attachment as a viewer for comparing exchangeable lenses at camera shops. It should be understood that when the optical attachment is used in the above manner, a field-of-view frame corresponding to a field of an object to be photographed is provided in the vicinity of the focal plane of an exchangeable lens so as to obtain a clearer picture angle of the exchangeable lens. The prism erecting system of the above optical attachment is not limited only to the so-called Schmidt type, but may be of any prism systems, including the Porro, Abbe, Springer and Hensoldt type in which a light incident surface and a light projecting surface are substantially normal to the optical axis of a mounted exchangeable lens. In addition, the magnification of an ocular system is not limited to that mentioned above.

A strap mounted means and a tripod mounting means may be provided on the circumferences of the external cylinder 10 and ocular cylinder 32 to facilitate carrying and use.

The above optical attachment is not limited in application to exchangeable lenses for use in single lens reflex cameras. Any exchangeable lens for lens exchangeable cameras, regardless of whether it is a still or movie camera, may be provided with an appropriate optical attachment having lens mounting means, a prism erecting system and a predetermined ocular section.

The optical attachment in accordance with the present invention comprises a lens mounting means for mounting an exchangeable lens, a prism erecting system having a light incident surface and a light projecting surface which are substantially on the optical axis of the exchangeable lens mounted on the lens mounting means. The prism system inverts the top, bottom, left and right of a real image through the exchangeable lens, and an ocular is provided at the rear of the prism erecting system. When used, the optical attachment is capable of converting an exchangeable lens for a camera such as an objective lens into a telescope, whereby a high performance telescope can be provided. Such a telesco pe is free to have varying magnifications by changing exchangeable lenses. With an intermediate or bellows for closeups provided between the optical attachment and an exchangeable lens, the optical attachment can further be used as a microscope. The microscope thus obtained is wide in field of view to produce high performance with erect images. In addition, such a telescope or a microscope may be used by looking at any desired object to be observed, resulting in great convenience of use. Yet, the optical attachment is compact, lightweight and very convenient to carry.

It is to be further understood that various modifications of the generic concepts of this invention are possible without departing from its spirit and accordingly the scope of the present invention should be determined solely from the following claims.

What is claimed is:

1. An optical attachment adapted for use with an objective camera exchangeable lens which includes a diaphragm interlocking member movable between a first position to maximize an aperture size of a diaphragm mechanism and a second position to minimize the aperture size, said diaphragm interlocking member being biased toward said second position, the optical attachment capable of providing a view of an object without the necessity of a camera body comprising:
    lens mounting means on which said camera exchangeable lens can be detachably mounted, said lens mounting means having an axis capable of alignment with an optical axis of a camera exchangeable lens when mounted thereon;
    a prism erecting system for rotating an image about vertical and horizontal axes, said prism erecting system provided on said axis and including a light entrance surface perpendicular to said axis and a light emitting surface in parallel with said light entrance surface;
    retaining means for retaining said diaphragm interlocking member in its first position when said camera exchangeable lens is operatively connected, and
    an occular system provided in the light path of the light emitted from said light emitting surface.

2. An optical attachment as set forth in claim 1 further comprising a dioptric adjusting assembly including means holding at least a part of said ocular system for axial movement thereof and externally accessible means interconnected to said part of ocular system for moving the same.

3. An optical attachment as set forth in claim 1 wherein said lens mounting means includes a plurality of flange retainer members of a complementary shape and configuration to lockingly interface with a bayonet flange.

4. An optical attachment as set forth in claim 1 wherein said prism erecting system is configured to position both the light entrance surface and the light emitting surface on a longitudinal axis substantially coincident with the optical axis.

5. An optical attachment as set forth in claim 1 wherein the ocular system includes a lens assembly capable of substantial magnification of the object image of the objective camera lens without substantial increase in the image aberrations to provide a telescope effect.

6. An optical attachment adapted for use with a camera exchangeable lens comprising:
    lens mounting means on which said camera exchangeable lens can be detachably mounted, said lens mounting means having an axis capable of alignment with an optical axis of said camera exchangeable lens when mounted thereon and means for automatically contacting and holding a diaphragm of the camera exchangeable lens to a nonadjustable maximum aperture opening;
    an ocular system having an optical axis in parallel with said axis of lens mounting means; and
    a prism erecting system for inverting an image both in horizontal and vertical directions, said prism erecting system being provided between said lens mounting means and said ocular system and having an optical axis connected to said axis of lens mounting means and said optical axis of ocular system.

7. A combination of a camera objective exchangeable lens and an optical attachment device for use as a monocular optical device comprising:
    a camera exchangeable lens with a diaphragm detachably mountable on a camera for use as an objective, said camera exchangeable lens having an optical axis and a diaphragm interlocking member movable between a first position to maximize an aperture size of a diaphragm mechanism and a second position to minimize the aperture size, said diaphragm interlocking member being biased toward said second position; and an optical attachment detachably mounted on said camera exchangeable lens, said optical attachment including an ocular system having an optical axis in parallel with said optical axis of said camera exchangeable lens and a prism erecting system for inverting an image both in horizontal and vertical directions, said prism erecting system being provided between said camera exchangeable lens and said ocular system and having an optical axis connected to said axis of both of said camera exchangeable lens and ocular system, said optical attachment includes retaining means for retaining said diaphragm interlocking member in its first position.

8. The device as set forth in claim 7, wherein said optical attachment further includes a dioptric adjusting device including means holding at least a part of said ocular system for axial movement thereof and externally accessible means interconnected to said part of ocular system for moving the same.

* * * * *